US010928708B2

(12) United States Patent
Zhao et al.

(10) Patent No.: US 10,928,708 B2
(45) Date of Patent: Feb. 23, 2021

(54) GIMBAL FRAME AND GIMBAL HAVING SAME, AND PHOTOGRAPHING APPARATUS

(71) Applicant: SZ DJI OSMO TECHNOLOGY CO., LTD., Shenzhen (CN)

(72) Inventors: Yanchong Zhao, Shenzhen (CN); Guoyao Liu, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/454,534

(22) Filed: Jun. 27, 2019

(65) Prior Publication Data

US 2019/0317385 A1 Oct. 17, 2019

Related U.S. Application Data

(63) Continuation of application No. PCT/CN2016/112789, filed on Dec. 28, 2016.

(51) Int. Cl.
*G03B 17/56* (2006.01)
*F16M 11/12* (2006.01)
(Continued)

(52) U.S. Cl.
CPC .......... *G03B 17/561* (2013.01); *F16M 11/04* (2013.01); *F16M 11/10* (2013.01); *F16M 11/12* (2013.01);
(Continued)

(58) Field of Classification Search
CPC ........ G03B 17/56; F16M 11/56; F16M 11/12; F16M 11/10; F16M 11/18
(Continued)

(56) References Cited

U.S. PATENT DOCUMENTS

| 7,124,656 B2 * | 10/2006 | Miller | F16M 11/08 74/5.1 |
| 2010/0158499 A1 * | 6/2010 | Kendall | G03B 17/00 396/428 |

(Continued)

FOREIGN PATENT DOCUMENTS

| CN | 104254725 | * 12/2014 | ............. F16F 15/28 |
| CN | 104254725 A | 12/2014 | |

(Continued)

OTHER PUBLICATIONS

World Intellectual Property Organization (WIPO) International Search Report for PCT/CN2016/112789 dated Sep. 28, 2017 8 pages.

*Primary Examiner* — Clayton E. LaBalle
*Assistant Examiner* — Kevin C Butler
(74) *Attorney, Agent, or Firm* — Anova Law Group, PLLC (57) ABSTRACT

A gimbal frame comprises at least one guide rod; and a center of gravity adjusting and locking mechanism mounted at the at least one guide rod. The center of gravity adjusting and locking mechanism comprises: a sleeve coupled to the guide rod and capable of moving on the at least one guide rod so as to adjust a center of gravity of the gimbal frame, a moving member disposed at one side of the at least one guide rod and disposed inside the sleeve, and an operating member coupled to the sleeve and in transmission connection with the moving member. When the operating member is operated, the moving member is driven to move towards the at least one guide rod so as to tightly abut against the at least one guide rod.

20 Claims, 5 Drawing Sheets

(51) Int. Cl.
*F16M 11/18* (2006.01)
*F16M 11/10* (2006.01)
*F16M 11/04* (2006.01)

(52) U.S. Cl.
CPC .......... *F16M 11/123* (2013.01); *F16M 11/18* (2013.01); *F16M 2200/021* (2013.01)

(58) Field of Classification Search
USPC ........................................................ 396/428
See application file for complete search history.

(56) References Cited

U.S. PATENT DOCUMENTS

| | | | |
|---|---|---|---|
| 2013/0259463 A1 | 10/2013 | Dybowski | |
| 2014/0267805 A1* | 9/2014 | Webb | H04N 5/23258 |
| | | | 348/208.2 |
| 2017/0078538 A1* | 3/2017 | Zhu | H04N 5/2253 |
| 2017/0099416 A1* | 4/2017 | Pan | F16M 11/123 |
| 2017/0108161 A1* | 4/2017 | Zhao | G03B 17/561 |
| 2017/0108761 A1* | 4/2017 | Pan | F16M 13/04 |
| 2017/0131623 A1* | 5/2017 | Zhou | F16M 11/205 |
| 2017/0174362 A1* | 6/2017 | Zhao | G03B 15/006 |
| 2018/0319512 A1* | 11/2018 | Kang | B64D 47/08 |
| 2018/0335178 A1* | 11/2018 | Bin | F16M 11/38 |
| 2019/0301664 A1* | 10/2019 | Zhao | F16M 11/205 |
| 2019/0302578 A1* | 10/2019 | Zhao | F16M 11/205 |
| 2019/0316731 A1* | 10/2019 | Zhao | F16M 11/24 |
| 2019/0317386 A1* | 10/2019 | Zhao | F16M 11/04 |

FOREIGN PATENT DOCUMENTS

| | | | | |
|---|---|---|---|---|
| CN | 204062364 | * | 12/2014 | ............. F16M 11/12 |
| CN | 204437591 | * | 7/2015 | ............. F16M 11/04 |
| CN | 104981644 | * | 10/2015 | ............. F16M 11/04 |
| CN | 205076055 U | | 3/2016 | |
| CN | 105518369 A | | 4/2016 | |
| CN | 205396566 | * | 7/2016 | ............. B64D 47/08 |
| CN | 205396566 U | | 7/2016 | |
| CN | 205447201 U | | 8/2016 | |
| CN | 206361361 U | | 7/2017 | |
| CN | 107110418 | * | 8/2017 | ............. F16M 11/12 |
| CN | 107110419 A | | 8/2017 | |

* cited by examiner

GIMBAL FRAME AND GIMBAL HAVING SAME, AND PHOTOGRAPHING APPARATUS

CROSS-REFERENCE TO RELATED APPLICATION

This application is a continuation application of International Application No. PCT/CN2016/112789, filed on Dec. 28, 2016, the entire contents of which are incorporated herein by reference.

TECHNICAL FIELD

The present disclosure relates to a gimbal frame and a gimbal having same, and a photographing apparatus.

BACKGROUND

A photographing apparatus often includes a gimbal and a photographing device mounted at the gimbal. The gimbal is configured to fix the photographing device and adjust the posture of the photographing device. For example, the gimbal adjusts the height and/or direction of the photographing device, and maintains the photographing device stably in a certain posture, thereby stabilizing the photographing device and realizing a smooth and multi-angle photographing. During film shooting, the shooting environment and shooting demands are varied and, thus, the photographing device may be frequently changed at the shooting site, or demounted and mounted, which requires a frequent adjustment of the center of gravity of the gimbal. Because the current professional photographing device has a substantially large weight, the adjustment of the center of gravity may be difficult to be controlled. In the existing technology, when adjusting the center of gravity, due to the absence of the fine adjusting mechanism, the large weight of the photographing device itself and the corresponding large friction, the center of gravity may be difficult to be accurately adjusted. In addition, the connection reliability of the center of gravity adjusting mechanism is poor.

SUMMARY

In accordance with the disclosure, there is provided a gimbal frame. The gimbal frame comprises at least one guide rod; and a center of gravity adjusting and locking mechanism mounted at the at least one guide rod. The center of gravity adjusting and locking mechanism comprises: a sleeve coupled to the at least one guide rod and capable of moving on the at least one guide rod so as to adjust a center of gravity of the gimbal frame, a moving member disposed at one side of the at least one guide rod and disposed inside the sleeve, and an operating member coupled to the sleeve and in transmission connection with the moving member. When the operating member is operated, the moving member is driven to move towards the guide rod so as to tightly abut against the at least one guide rod.

Also, in accordance with the disclosure, there is provided a gimbal. The gimbal comprises a gimbal frame configured to install a load; and a motor assembly mounted at the gimbal frame and capable of driving the gimbal frame to rotate. The gimbal frame comprises a guide rod; and a center of gravity adjusting and locking mechanism mounted at the guide rod. The center of gravity adjusting and locking mechanism comprises: a sleeve coupled to the guide rod and capable of moving on the guide rod so as to adjust a center of gravity of the gimbal frame, a moving member disposed at one side of the guide rod and disposed inside the sleeve, and an operating member coupled to the sleeve and in transmission connection with the moving member. When the operating member is operated, the moving member is driven to move towards the guide rod so as to tightly abut against the guide rod.

Also, in accordance with the disclosure, there is provided a photographing apparatus. The photographing apparatus comprises a photographing device comprising a gimbal. The gimbal comprises a gimbal frame and a motor assembly configured to drive the gimbal frame to rotate, the photographing device is mounted at the gimbal frame, and the motor assembly is configured to change a height and/or a direction of the photographing device and stably maintain the photographing device in a preset posture. The gimbal frame comprises a guide rod; and a center of gravity adjusting and locking mechanism mounted at the guide rod. The center of gravity adjusting and locking mechanism comprises: a sleeve coupled to the guide rod and capable of moving on the guide rod so as to adjust a center of gravity of the gimbal frame, a moving member disposed at one side of the guide rod and disposed inside the sleeve, and an operating member coupled to the sleeve and in transmission connection with the moving member. When the operating member is operated, the moving member is driven to move towards the guide rod so as to tightly abut against the guide rod.

DESCRIPTION OF MAIN COMPONENTS AND REFERENCE NUMERALS

| Photographing apparatus | 1 |
| --- | --- |
| Gimbal | 2 |
| Gimbal frame | 20 |
| Motor assembly | 20a |
| First guide rod | 21 |
| Receiving slot | 211 |
| Second guide rod | 22 |
| Mounting slot | 221 |
| Third guide rod | 23 |
| Sleeve | 24 |
| Opening | 241 |
| Positioning slot | 242 |
| Mounting plate | 25 |
| Connecting rod | 26 |
| Loading platform | 27 |
| Fastener | 28 |
| End cap | 29 |
| Photographing device | 3 |
| Fastening mechanism | 4 |
| Center of gravity adjusting and locking mechanism | 5 |
| Transmission assembly | 500 |
| Lead screw | 51 |
| Screw body | 511 |

-continued

| | |
|---|---|
| Knob | 512 |
| Transmission member | 52 |
| Retaining plate | 521 |
| Lead screw nut | 522 |
| Nut hole | 5221 |
| Second receding hole | 523 |
| Moving member | 53 |
| Main body | 531 |
| Abutting surface | 5311 |
| Second positioning hole | 532 |
| Retaining hole | 533 |
| Operating member | 54 |
| Screw head | 541 |
| Connecting segment | 542 |
| Threaded segment | 543 |
| Sleeve | 50 |
| First adjusting member | 55 |
| First main body | 551 |
| First surface | 5511 |
| First abutting surface | 5512 |
| Notch | 552 |
| Through-hole | 553 |
| First receding hole | 554 |
| Second adjusting member | 56 |
| Second main body | 561 |
| Second surface | 5611 |
| Second abutting surface | 5612 |
| Groove | 562 |
| First positioning hole | 563 |
| Lever | 57 |
| Cover | 58 |
| Pin | 59 |

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

As used herein, when a first component is referred to as "mounted" at a second component, it is intended that the first component may be directly mounted at the second component or may be indirectly mounted at the second component via a third component between them. When a first component is referred to as "connecting/connected" to a second component, it is intended that the first component may be directly connecting/coupled to the second component or may be indirectly connecting/coupled to the second component via a third component between them. When a first component is referred to as "arranged/disposed" at a second component, it is intended that the first component may be directly arranged/disposed at the second component or may be indirectly arranged at the second component via a third component between them. The terms "vertical", "horizontal", "left", "right", and the like, as used herein, are for illustrative purposes only.

Unless otherwise defined, all the technical and scientific terms used herein have the same or similar meanings as generally understood by one of ordinary skill in the art. As described herein, the terms used in the specification of the present disclosure are intended to describe exemplary embodiments, instead of limiting the present disclosure. The term "and/or" used herein includes any suitable combination of one or more related items listed.

The present disclosure provides a gimbal frame for installing a load. The gimbal frame may comprise a guide rod, and a center of gravity adjusting and locking mechanism mounted at the guide rod. The center of gravity adjusting and locking mechanism may comprise a sleeve coupled to the guide rod and capable of moving on the guide rod, so as to adjust the center of gravity of the gimbal frame; a moving member disposed at one side of the guide rod and disposed inside the sleeve; and an operating member coupled to the sleeve. The operating member may be in transmission connection with the moving member. When the operating member is operated, the moving member may be driven to move towards the guide rod so as to tightly abut against the guide rod.

The present disclosure provides a gimbal including a motor assembly and a gimbal frame for installing a load. The motor assembly may be mounted at the gimbal frame and capable of driving the gimbal frame to rotate. The gimbal frame may comprise a guide rod, and a center of gravity adjusting and locking mechanism mounted at the guide rod. The center of gravity adjusting and locking mechanism may comprise a sleeve coupled to the guide rod and capable of moving on the guide rod, so as to adjust the center of gravity of the gimbal frame; a moving member disposed at one side of the guide rod and disposed inside the sleeve; and an operating member coupled to the sleeve. The operating member may be in transmission connection with the moving member. When the operating member is operated, the moving member may be driven to move towards the guide rod so as to tightly abut against the guide rod.

The present disclosure provides a photographing apparatus comprising a photographing device. The photographing device may comprise a gimbal. The gimbal may include a gimbal frame and a motor assembly for driving the gimbal frame to rotate. The photographing device may be mounted at the gimbal frame, and the motor assembly may be configured to change a height and/or a direction of the photographing device and to stably maintain the photographing device in a preset posture. The gimbal frame may comprise a guide rod, and a center of gravity adjusting and locking mechanism mounted at the guide rod. The center of gravity adjusting and locking mechanism may comprise a sleeve coupled to the guide rod and capable of moving on the guide rod, so as to adjust the center of gravity of the gimbal frame; a moving member disposed at one side of the guide rod and disposed inside the sleeve; and an operating member coupled to the sleeve. The operating member may be in transmission connection with the moving member. When the operating member is operated, the moving member may be driven to move towards the guide rod so as to tightly abut against the guide rod.

Exemplary embodiments will be described with reference to the accompanying drawings. In the situation where the technical solutions described the disclosed embodiments are not conflicting, they can be combined.

Figure 1:
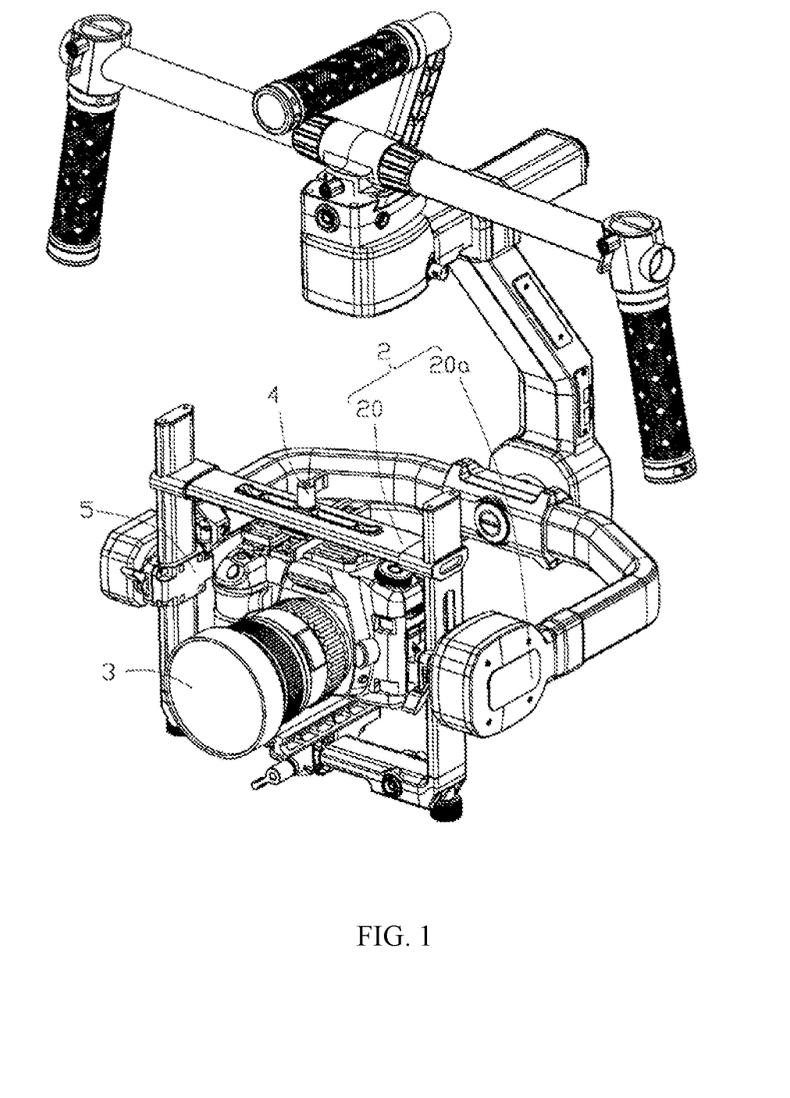
FIG. 1 is a perspective view of a photographing apparatus according to an embodiment of the disclosure.

FIG. 1 is a perspective view of a photographing apparatus 1 according to an embodiment of the disclosure. As shown in FIG. 1, the photographing apparatus 1 may include a gimbal 2 and a photographing device 3. The gimbal 2 may include a gimbal frame 20 and a motor assembly 20a. The motor assembly 20a may be mounted at the gimbal frame 20 to drive the gimbal frame 20 to rotate. The photographing device 3 may be mounted at the gimbal frame 20. The gimbal frame 20 may change the height and/or direction of the photographing device 3 when driven by the motor assembly 20a, and stabilize the photographing device 3 in a preset posture. The photographing device 3 may employ different types of video cameras or cameras.

In the disclosed embodiments, the motor assembly 20a may be a pitch-axis motor that drives the gimbal frame 20 to rotate about a pitch axis. Further, the gimbal 2 may be a three-axis gimbal, so the gimbal 2 may further include a roll-axis motor and a yaw-axis motor, and a roll-axis assembly driven by the roll-axis motor and a yaw-axis assembly driven by the yaw-axis motor, such that the photographing device 3 mounted at the gimbal 2 may be able to be rotated about the pitch axis, the roll axis, and the yaw axis, achieving a large angle of shooting.

Figure 2:
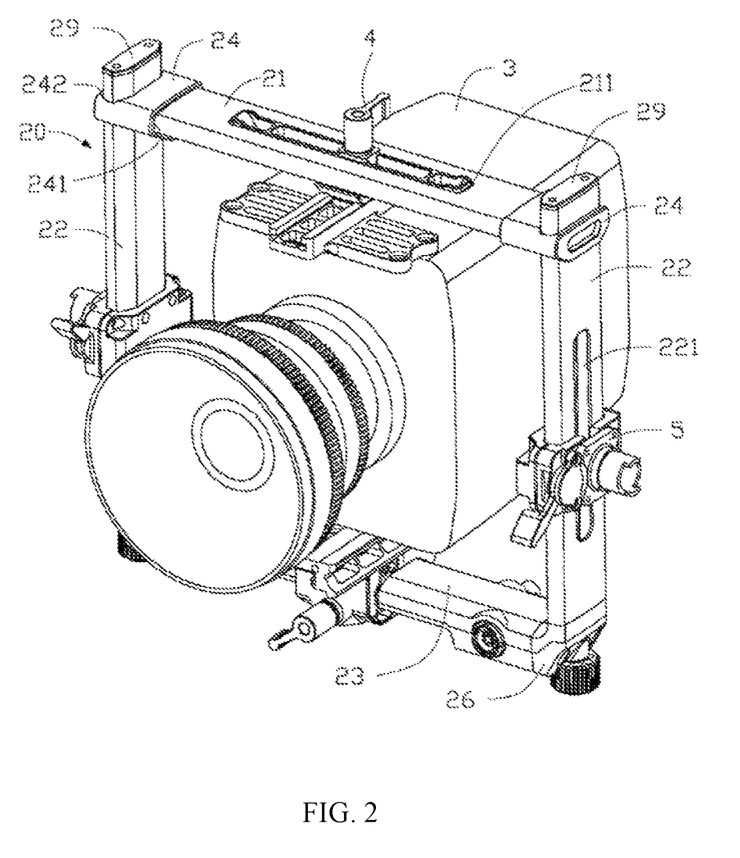
FIG. 2 is a perspective assembled view of a gimbal frame and another photographing device in FIG. 1.
Figure 3:
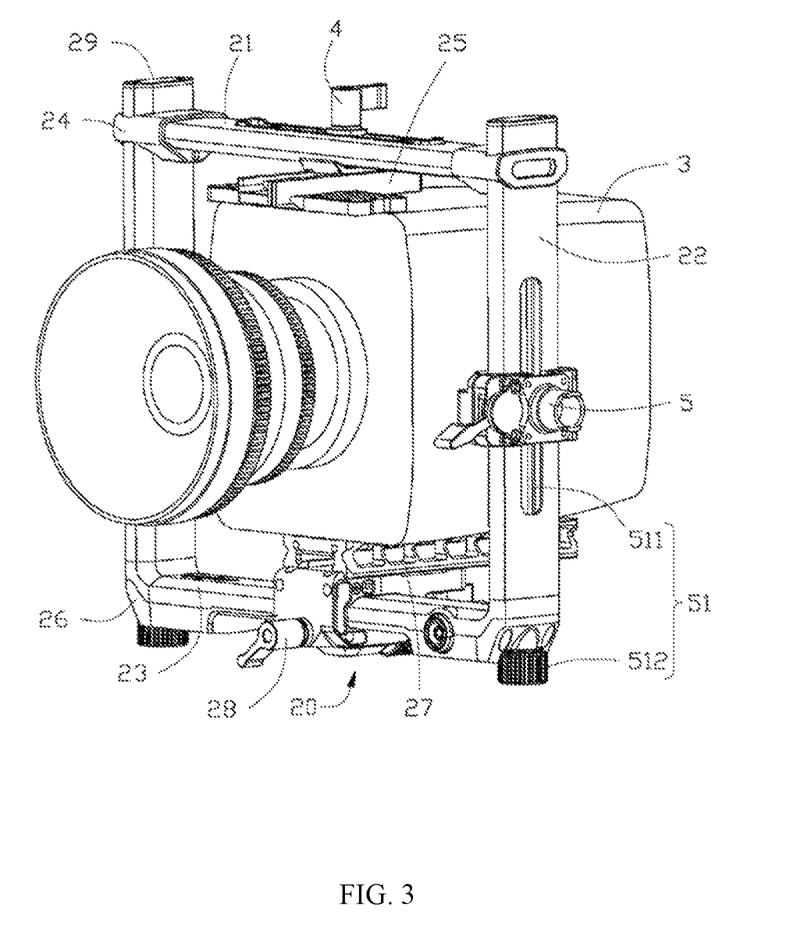
FIG. 3 is a perspective assembled view of the gimbal frame and the photographing device in FIG. 2 from another aspect.

FIG. 2 is a perspective assembled view of a gimbal frame and another photographing device in FIG. 1. FIG. 3 is a perspective assembled view of the gimbal frame and the photographing device in FIG. 2 from another aspect.

As shown in FIGS. 2 and 3, the gimbal frame 20 may include a first guide rod 21, two second guide rods 22, and at least one center of gravity adjusting and locking mechanism 5. Two second guide rods 22 may be disposed opposite to each other, and respectively coupled to two ends of the first guide rod 21. The center of gravity adjusting and locking mechanism 5 may be disposed at at least one of the guide rods of the gimbal frame 20. In the disclosed embodiments, the gimbal frame 20 may include two center of gravity adjusting and locking mechanisms 5, which may be respectively fixed to the two second guide rods 22 to adjust the center of gravity of the gimbal frame 20, thereby stably maintaining the photographing device 3 in a preset posture. In some embodiments, the center of gravity adjusting and locking mechanism 5 may be disposed at other guide rods, which is not limited to the second guide rod 22, the first guide rod 21 and the like.

The first guide rod 21 may have an elongated striped shape. The first guide rod 21 may be a hollow body that has openings at both ends. In the disclosed embodiments, the first guide rod 21 may be approximately a cuboid. In some embodiments, the first guide rod 21 may have other shapes, such as a hollow cylinder. The first guide rod 21 may be provided with a receiving slot 211. In one embodiment, the receiving slot 211 may be disposed at the center of the first guide rod 21. The receiving slot 211 may penetrate the first guide rod 21 at the two opposite sides of the first guide rod 21. In one embodiment, the receiving slot 211 may have a rectangular shape. The longitudinal direction of the receiving slot 211 may be the same as the longitudinal direction of the first guide rod 21, i.e., parallel to the longitudinal direction of the first guide rod 21.

Each of the second guide rods 22 may have an elongated striped shape. The second guide rod 22 may be a hollow body that has openings at both ends. In the disclosed embodiments, the second guide rods 22 may be approximately a cuboid. In some embodiments, the second guide rods 22 may have other shapes, such as a hollow cylinder. One side of the second guide rod 22 may be provided with a mounting slot 221. In one embodiment, the mounting slot 221 may have a rectangular shape. The longitudinal direction of the mounting slot 221 may be the same as or parallel to the longitudinal direction of the second guide rod 22. The center of gravity adjusting and locking mechanism 5 may be disposed at the mounting slot 221 and movable along the mounting slot 221.

Further, the gimbal frame 20 may further include two sleeves 24 and a mounting plate 25. The two second guide rods 22 may be respectively disposed at two ends of the first guide rod 21 via the sleeve 24. The mounting plate 25 may be slidably disposed at the first guide rod 21 to fix the photographing device 3. The gimbal frame 20 also may include a fastening mechanism 4. The fastening mechanism 4 may be disposed at the first guide rod 21. The fastening mechanism 4 may be configured to simultaneously lock a plurality of structural members of the gimbal frame 20. In particular, the fastening mechanism 4 may be mounted at the receiving slot 211. The mounting plate 25 may be fixed to the first guide rod 21 by the fastening mechanism 4. The fastening mechanism 4 may be configured to lock the mounting plate 25 of the gimbal frame 20 and the two second guide rods 22.

Two sleeves 24 may be respectively fixed to opposite ends of the first guide rod 21. Each sleeve 24 may have a striped shape. The sleeve 24 may be a hollow body that has an opening at least at one end. The shape and size of an opening 241 of the sleeve 24 may be respectively adapted to the shape and size of the cross-section of the first guide rod 21, thereby enabling the sleeve 24 to be sleeved and fixed to the end of the first guide rod 21. In the disclosed embodiments, the sleeve 24 may be approximately a cuboid. In some embodiments, the sleeve 24 may be in other shapes, such as a cylinder or the like. The side surface of the sleeve 24 may be provided with a positioning slot 242. The positioning slot 242 may penetrated the sleeve 24 at two opposite sides of the sleeve 24, for positioning the two second guide rods 22. In particular, each sleeve 24 may be sleeved at one end of a corresponding second guide rod 22 through the positioning slot 242.

Further, the gimbal frame 20 may include a third guide rod 23. The shape of the third guide rod 23 may be similar to that of the first guide rod 21. The third guide rod 23 may be disposed opposite to the first guide rod 21 and between the two second guide rods 22. The third guide rod 23 may connect the two second guide rods 22 to enhance the stability of the gimbal frame 20. In particular, the first guide rod 21, the two second guide rods 22 and the third guide rod 23 may collectively form a quadrilateral. In some embodiments, the third guide rod 23 may be omitted, as the part of the second guide rod 22 may be a solid structure.

Further, the gimbal frame 20 may include two connecting rods 26. Each connecting rod 26 may be disposed between the second guide rod 22 and the third guide rod 23 to connect the second guide rod 22 and the third guide rod 23. In some embodiments, the connecting rod 26 may be omitted.

Further, the gimbal frame 20 may include a loading platform 27. The loading platform 27 may be fixed to the third guide rod 23 by a fastener 28. The loading platform 27 may be configured to carry a part of the weight of the photographing device 3. In some embodiments, the loading platform 27 and the fastener 28 may be omitted.

Further, the gimbal frame 20 may include two end caps 29, which may be respectively fixed to the top ends of the two second guide rods 22 to close the second guide rods 22. In some embodiments, the end cap 29 may be omitted.

Figure 4:
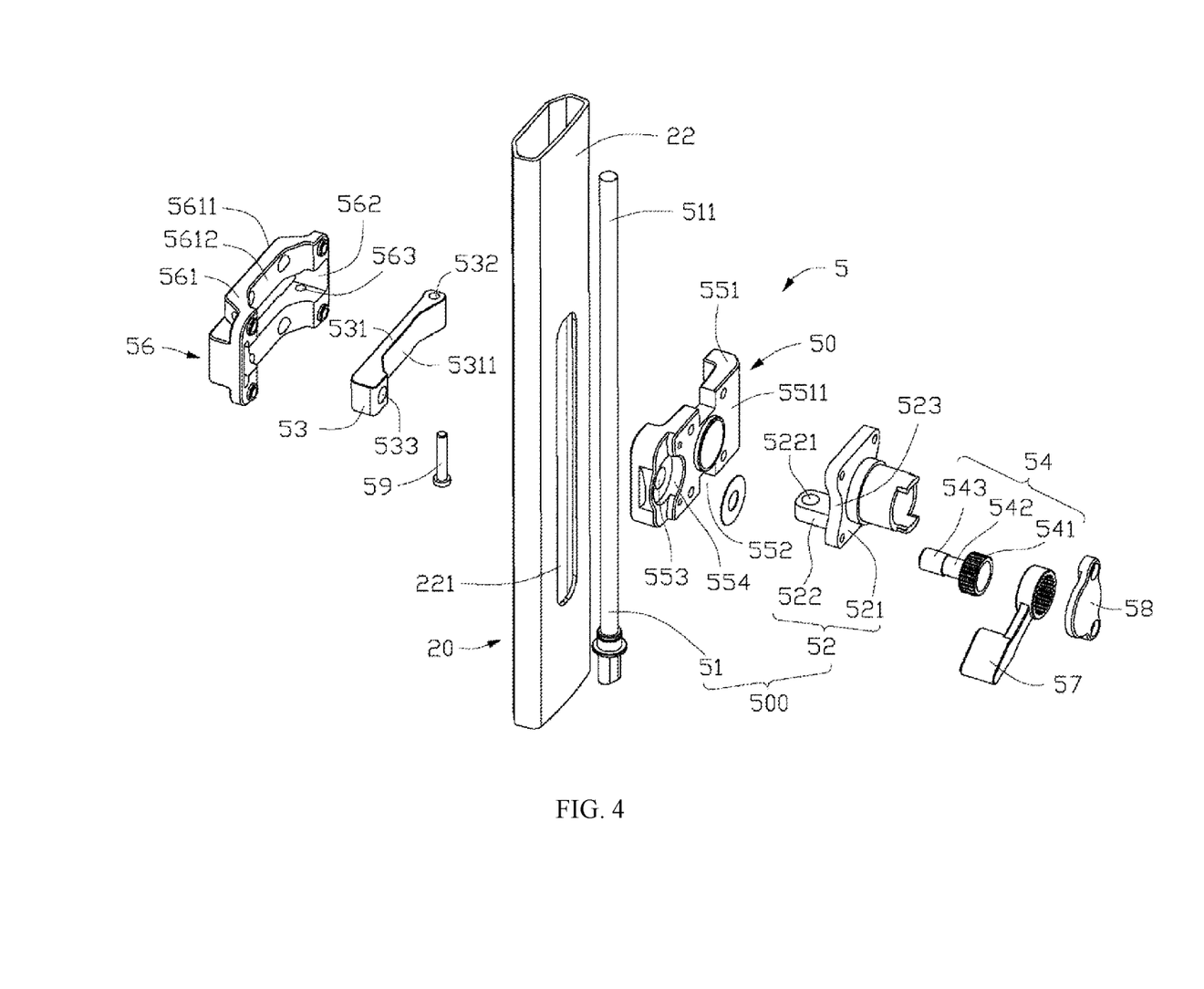
FIG. 4 is an exploded perspective view of a partial structure of the gimbal frame in FIG. 2.
Figure 5:
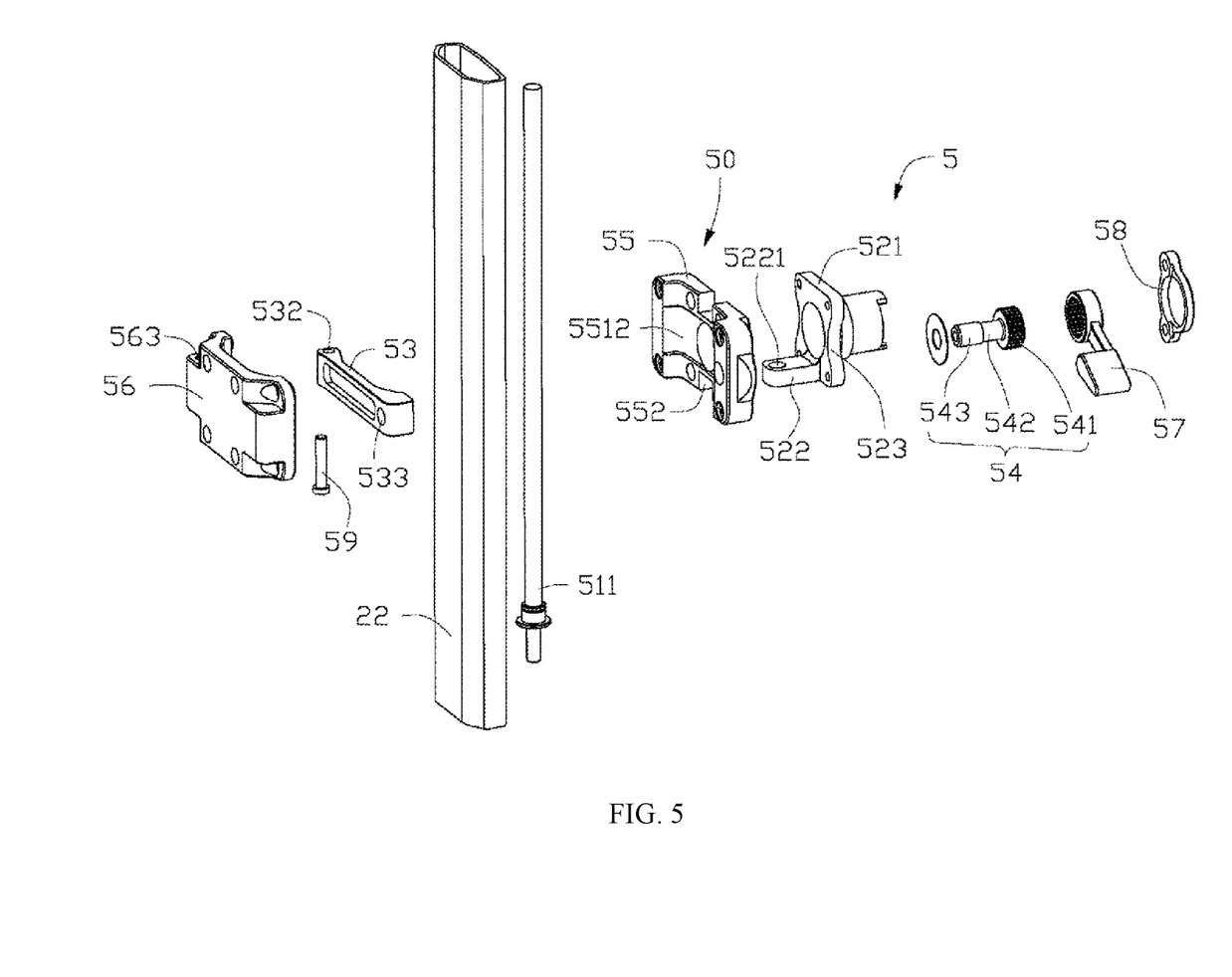
FIG. 5 is an exploded view of the gimbal frame in FIG. 4 from another aspect.

FIG. 4 is an exploded perspective view of a partial structure of the gimbal frame in FIG. 2. FIG. 5 is an exploded view of the gimbal frame in FIG. 4 from another aspect. As shown in FIG. 2 and FIGS. 4-5, the center of gravity adjusting and locking mechanism 5 may include a sleeve 50, a moving member 53, and an operating member 54. The sleeve 50 may be coupled to the second guide rod 22 and movable on the second guide rod 22 to adjust the center of gravity of the gimbal frame 20. The moving member 53 may be disposed at one side of the second guide rod 22 and coupled to the sleeve 50. The operating member 54 may be coupled to the sleeve 50, and coupled to the moving member 53 in a transmission connection or on a transmission basis. When the operating member 54 is operated, the moving member 53 may be driven to move towards the second guide rod 22 so as to tightly abut against the second guide rod 22.

The sleeve 50 may be sleeved at the second guide rod 22. In the disclosed embodiments, the sleeve 50 may include a first adjusting member 55 and a second adjusting member 56. The first adjusting member 55 and the second adjusting member 56 may be relatively fixed to each other, and may be respectively disposed at two opposite sides of the second guide rod 22.

The first adjusting member 55 may include a first main body 551. The first main body 551 may include a first surface 5511 and a first abutting surface 5512 disposed opposite to the first surface 5511. The first abutting surface 5512 may be facing the second guide rod 22. The shape of the first abutting surface 5512 may be adapted to a portion of the outside surface of the second guide rod 22 for holding the second guide rod 22 when the operating member 54 is operated. The first main body 551 may be further provided with a through-hole 553. The through-hole 553 may penetrate the first surface 5511 and the first abutting surface 5512. The operating member 54 may extend into the through-hole 553.

The second adjusting member 56 may include a second main body 561. The second main body 561 may include a second surface 5611 and a second abutting surface 5612 disposed opposite to the second surface 5611. The second abutting surface 5612 may be facing the second guide rod 22. The shape of the second abutting surface 5612 may be adapted to a portion of the outside surface of the second guide rod 22 to tightly abut against the second guide rod 22 when the operating member 54 is operated.

In some embodiments, the arrangement of the sleeve 50 may vary according to various application scenarios, for example, the second adjusting member 56 may be omitted.

The moving member 53 may include a main body 531. The main body 531 may include an abutting surface 5311. The abutting surface 5311 may be disposed facing the second guide rod 22. The shape of the abutting surface 5311 may be adapted to a portion of the outside surface of the second guide rod 22 to tightly abut against the second guide rod 22 when the operating member 54 is operated. The moving member 53 may be disposed at one side of the second guide rod 22 and between the second adjusting member 56 and the second guide rod 22. The moving member 53 may be movably coupled to the second adjusting member 56.

In particular, the second main body 561 of the second adjusting member 56 may be provided with a groove 562. The groove 562 may be formed by recessing from the second abutting surface 5612 towards the second surface 5611. The shape of the groove 562 may be adapted to the shape of the moving member 53 to receive the moving member 53. The moving member 53 may be rotatably coupled to the second adjusting member 56, and the rotating shaft of the moving member 53 may be parallel to the extending direction of the second guiding rod 22.

The second main body 561 of the second adjusting member 56 may be further provided with a first positioning hole 563. Correspondingly, the main body 531 of the moving member 53 may be provided with a second positioning hole 532. The center of gravity adjusting and locking mechanism 5 may further include a pin 59, which is extending into both the first positioning hole 563 and the second positioning hole 532 to movably couple the moving member 53 and the second adjusting member 56.

The operating member 54 may penetrate at least one of the first adjusting member 55 and the second adjusting member 56, and may be coupled to the moving member 53 in a transmission connection. In one embodiment, the operating member 54 may penetrate the through-hole 553 of the first adjusting member 55 to be coupled to the moving member 53 in the transmission connection. In one embodiment, the operating member 54 may be a threaded connector, and the operating member 54 may be screwed to the moving member 53. In another embodiment, the operating member 54 may be a stud, a telescopic sleeve, or the like.

In particular, the operating member 54 may include a screw head 541, a connecting segment 542, and a threaded segment 543. The connecting segment 542 may be disposed between the screw head 541 and the threaded segment 543. In one embodiment, the screw head 541, the connecting segment 542 and the threaded segment 543 each may be a cylinder. The threaded segment 543 may be provided with an external thread for screwing with the moving member 53. Correspondingly, the main body 531 of the moving member 53 may be further provided with a retaining hole 533. The retaining hole 533 may be disposed facing the second guide rod 22. The retaining hole 533 may be a threaded hole for screwing with the operating member 54. The retaining hole 533 may be a through-hole or a blind hole. In one embodiment, the retaining hole 533 may be a through-hole. The retaining hole 533 and the first positioning hole 563 may be respectively disposed at two opposite ends of the main body 531.

Further, the center of gravity adjusting and locking mechanism 5 may include a lever 57. The lever 57 may be fixed to the screw head 541 of the operating member 54 to facilitate the user to rotate the operating member 54. Correspondingly, the first main body 551 of the first adjusting member 55 may be further provided with a first receding hole 554. The first receding hole 554 may be disposed right in front of the through-hole 553 to receive the screw head 541 and the lever 57. In particular, the first receding hole 554 may be formed by recessing from the first surface 5511 towards the first abutting surface 5512. The through-hole 553 may be formed by recessing from the first receding hole 554 towards the first abutting surface 5512. In some embodiments, the lever 57 may be omitted.

Further, the center of gravity adjusting and locking mechanism 5 may include a cover 58. The cover 58 may be fixed to the first adjusting member 55. The cover 58 may be fixed to the first receding hole 554 to shield the operating member 54 and the lever 57. In some embodiments, the cover 58 may be omitted.

The center of gravity adjusting and locking mechanism 5 may further include a lead screw 51 and a transmission member 52. The lead screw 51 may be housed inside the second guide rod 22, and the transmission member 52 may be sleeved on the lead screw 51 and may be coupled to the lead screw 51 in the transmission connection. The lead screw 51 and the transmission member 52 together may form a transmission assembly 500, which may be fixed to the sleeve 50 to drive the sleeve 50 to move on the second guide rod 22, thereby adjusting the center of gravity of the gimbal frame 20.

The lead screw 51 may include a screw body 511 and a knob 512. The screw body 511 may be housed in the second guide rod 22. The mounting slot 221 of the second guide rod 22 may expose a portion of the screw body 511. The knob 512 may be fixed to one end of the screw body 511 to rotate the screw body 511. The knob 512 may be disposed at one end of the second guide rod 22 to facilitate the adjustment.

The transmission member 52 may be fixed to a side of the second guide rod 22 where the side of the second guide rod 22 is provide with the mounting slot 221. The first adjusting member 55 may be fixed to the transmission member 52. In the disclosed embodiments, the first adjusting member 55 may be disposed between the second guide rod 22 and the transmission member 52. The transmission member 52 may penetrate the first adjusting member 55 and may be screwed to the lead screw 51 housed inside the second guide rod 22. In particular, the first main body 551 of the first adjusting member 55 may be provided with a notch 552 for giving way to the transmission member 52 and for the transmission member 52 to be extending into. In one embodiments, the notch 552 may have an approximately U shape.

The transmission member 52 may include a retaining plate 521 and a lead screw nut 522. The retaining plate 521 may be configured to retain the first adjusting member 55. The retaining plate 521 may be provided with a second receding hole 523. The second receding hole 523 may be formed by recessing inward from the periphery of the retaining plate 521. In one embodiment, the second receding hole 523 may have an approximately semi-circular shape to give way to the operating member 54. The lead screw nut 522 may be disposed at one side of the retaining plate 521 and may be disposed perpendicular to the retaining plate 521. The lead screw nut 522 may be provided with a nut hole 5221. The lead screw nut 522 may penetrate the notch 552 of the first adjusting member 55 to extend into the mounting slot 221. The nut hole 5221 may be housed in the second guide rod 22 and sleeved on the screw body 511, thereby coupled to the lead screw 51 in a transmission connection. When the lead screw 51 is rotated in a predetermined direction, the lead screw nut 522 may move in the mounting slot 221 along the screw body 511, so as to drive the sleeve 50 to move on the second guide rod 22.

Referring to FIG. 3 to FIG. 5, when installing the center of gravity adjusting and locking mechanism 5, the first adjusting member 55 may be fixed to the retaining plate 521 of the transmission member 52, where the first surface 5511 of the first adjusting member 55 may abut against the retaining plate 521, the lead screw nut 522 of the transmission member 52 may penetrate the notch 552 at the first adjusting member 55 and may be inserted into the second guide rod 22 at the mounting slot 221.

The knob 512 may be fixed to one end of the screw body 511, and the lead screw body 511 may be inserted into the second guide rod 22 at one end of the second guide rod 22 and penetrate the nut hole 5221 of the screw nut 522, such that the knob 512 may be disposed outside the second guide rod 22. The moving member 53 may be disposed at the groove 562 of the second adjusting member 56, the pin 59 may be configured to penetrate the first positioning hole 563 of the second adjusting member 56 and the second positioning hole 532 of the moving member 53, thereby coupling the moving member 53 to the second adjusting member 56.

The second adjusting member 56 and the first adjusting member 55 may be relatively fixed, where the abutting surface 5311 of the moving member 53 and the second abutting surface 5612 of the second adjusting member 56 may abut against one side of the second guide rod 22, and the first abutting surface 5512 of the first adjusting member 55 may abut against another side of the second guide rod 22.

The lever 57 may be fixed to the screw head 541 of the operating member 54, and the threaded segment 543 of the operating member 54 may be configured to sequentially perpetrate the second receding hole 523 of the transmission member 52, the first escaping hole 554 and the through-hole 553 of the first adjusting member 55, and the mounting slot 221 of the second guide rod 22, then screwed into the retaining hole 533 of the moving member 53, where the lever 57 may be housed in the first receding hole 554. The cover 58 may be fixed to the first adjusting member 55 so as to shield the operating member 54 and the lever 57.

Before the center of gravity adjusting and locking mechanism 5 performs the locking action, a user may adjust the center of gravity of the gimbal frame 20 by rotating the knob 512. In particular, through rotating the knob 512, the lead screw body 511 may be rotated by the knob 512, such that the transmission member 52 may be displaced up and down along the screw body 511. The transmission member 52 may drive the first adjusting member 55 and the second adjusting member 56 to move on the second guide rod 22, thereby adjusting the center of gravity of the gimbal frame 20.

After the center of gravity adjusting and locking mechanism 5 is locked, the lever 57 may be rotated, such that the moving member 53 may be further screwed with the operating member 54, where the moving member 53 may move towards the second guide rod 22 to abut against the second guide rod 22. As the moving member 53 moves towards the second guide rod 22, the distance between the moving member 53 and the screw head 541 may be reduced, the screw head 541 may force the first adjusting member 55 to move towards the second guide rod 22 to abut against the second guide rod 22.

In the disclosed embodiments, the gimbal frame 20, by means of the threaded engagement and connection of the moving member 53 and the operating member 54 in the center of gravity adjusting and locking mechanism 5, may convert a rotary movement into an axial movement, such that the moving member 53 and the operating member 54 may be able to drive the sleeve 50 to tightly hold the gimbal frame 20, which tightens and enhances the reliability of the connection. Meanwhile, the gimbal frame 20 may be driven by the screw of the lead screw 51 and the transmission member 52, thereby driving the sleeve 50 to move on the second guide rod 22 to adjust the center of gravity of the gimbal frame 20. Thus, the center of gravity of the gimbal frame 20 may be adjusted more accurately, controllably and conveniently.

The foregoing descriptions are merely specific implementations of the present disclosure, but are not intended to limit the protection scope of the present disclosure. Any equivalent variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What may be claimed is:

1. A gimbal frame comprising:
    at least one guide rod; and
    a center of gravity adjusting and locking mechanism mounted at the at least one guide rod,
    wherein the center of gravity adjusting and locking mechanism comprises:
        a sleeve coupled to the at least one guide rod and capable of moving on the at least one guide rod so as to adjust a center of gravity of the gimbal frame,
        a moving member disposed at one side of the at least one guide rod and disposed inside the sleeve, and
        an operating member coupled to the sleeve and in transmission connection with the moving member, wherein when the operating member is operated, the moving member is driven to move towards the at least one guide rod so as to tightly abut against the at least one guide rod.

2. The gimbal frame of claim 1, wherein:
the sleeve includes a first adjusting member and a second adjusting member relatively fixed to the first adjusting member,
wherein the first adjusting member and the second adjusting member are respectively disposed at two opposite sides of the at least one guide rod.

3. The gimbal frame of claim 2, wherein:
the moving member is coupled to the second adjusting member and disposed between the second adjusting member and the at least one guide rod.

4. The gimbal frame of claim 3, wherein:
the operating member penetrates the first adjusting member and the at least one guide rod, and is in transmission connection with the moving member, and
when being operated, the operating member drives the first adjusting member to abut against the at least one guide rod.

5. The gimbal frame of claim 4, wherein:
the first adjusting member is provided with a through-hole, wherein the through-hole penetrates the first adjusting member, and the moving member extends into the through-hole.

6. The gimbal frame of claim 3, wherein:
the second adjusting member is provided with a groove,
wherein the groove is disposed facing the at least one guide rod, and a shape of the groove is adapted to a shape of the moving member to accommodate the moving member.

7. The gimbal frame of claim 6, where:
the moving member is rotatably coupled to the second adjusting member; and
a rotating shaft of the moving member is parallel to an extending direction of the at least one guide rod.

8. The gimbal frame of claim 7, wherein:
the second adjusting member is provided with a first positioning hole;
the moving member is provided with a second positioning hole; and
the center of gravity adjusting and locking mechanism includes a pin, which extends into both the first positioning hole and the second positioning to movably couple the moving member to the second adjusting member.

9. The gimbal frame of claim 1, wherein:
the operating member is a threaded connector; and
the operating member is coupled to the moving member through a threaded connection.

10. The gimbal frame of claim 9, wherein:
the operating member includes a threaded segment; and
the moving member is provided with a retaining hole,
wherein the threaded segment is housed in the retaining hole and screwed into the retaining hole.

11. The gimbal frame of claim 1, wherein:
the center of gravity adjusting and locking mechanism further includes a transmission assembly which is fixed at the sleeve to drive the sleeve to move on the at least one guide rod.

12. The gimbal frame of claim 11, wherein:
the transmission assembly includes a lead screw and a transmission member,
wherein the lead screw is housed in the at least one guide rod, the transmission member is sleeved on the lead screw and in transmission connection with the lead screw, and the sleeve is fixed to the transmission member.

13. The gimbal frame of claim 12, wherein:
the transmission member includes a retaining plate, and the sleeve is fixed to the retaining plate.

14. The gimbal frame of claim 13, wherein:
the transmission member includes a lead screw nut disposed at one side of the retaining plate; and
the at least one guide rod is provided with a mounting slot,
wherein the lead screw nut extends from the mounting slot into the at least one guide rod to be sleeved on the lead screw so as to be coupled to the lead screw through a threaded connection.

15. The gimbal frame of claim 1, wherein:
the at least one guide rod includes a first guide rod and a second guide rod,
wherein the center of gravity adjusting and locking mechanism is mounted at the second guide rod.

16. The gimbal frame of claim 15, wherein:
the at least one guide rod includes two second guide rods and two center of gravity adjusting and locking mechanisms which are respectively mounted at the two second guide rods.

17. The gimbal frame of claim 16, further comprising:
a fastening mechanism disposed at the first guide rod,
wherein the mounting plate is mounted at the fastening mechanism, and the fastening mechanism is configured to lock the second guide rod and the mounting plate.

18. The gimbal frame of claim 15, further comprising:
a mounting plate slidably disposed at the first guide rod.

19. A gimbal comprising:
a gimbal frame configured to install a load; and
a motor assembly mounted at the gimbal frame and capable of driving the gimbal frame to rotate,
wherein the gimbal frame comprises:
 a guide rod; and
 a center of gravity adjusting and locking mechanism mounted at the guide rod,
 wherein the center of gravity adjusting and locking mechanism comprises:
  a sleeve coupled to the guide rod and capable of moving on the guide rod so as to adjust a center of gravity of the gimbal frame,
  a moving member disposed at one side of the guide rod and disposed inside the sleeve, and
  an operating member coupled to the sleeve and in transmission connection with the moving member, wherein when the operating member is operated, the moving member is driven to move towards the guide rod so as to tightly abut against the guide rod.

20. A photographing apparatus comprising:
a photographing device comprising a gimbal,
wherein the gimbal comprises a gimbal frame and a motor assembly configured to drive the gimbal frame to rotate,
the photographing device is mounted at the gimbal frame, and
the motor assembly is configured to change a height and/or a direction of the photographing device and stably maintain the photographing device in a preset posture,
wherein the gimbal frame comprises:
 a guide rod; and
 a center of gravity adjusting and locking mechanism mounted at the guide rod, wherein the center of gravity adjusting and locking mechanism comprises:
  a sleeve coupled to the guide rod and capable of moving on the guide rod so as to adjust a center of gravity of the gimbal frame,
  a moving member disposed at one side of the guide rod and disposed inside the sleeve, and
  an operating member coupled to the sleeve and in transmission connection with the moving member, wherein when the operating member is operated, the moving member is driven to move towards the guide rod so as to tightly abut against the guide rod.

\* \* \* \* \*